March 14, 1961 S. K. ALLISON 2,975,114
REACTOR
Filed May 8, 1946 3 Sheets-Sheet 1

Inventor:
Samuel K. Allison
By:
Robert A. [signature]
Attorney

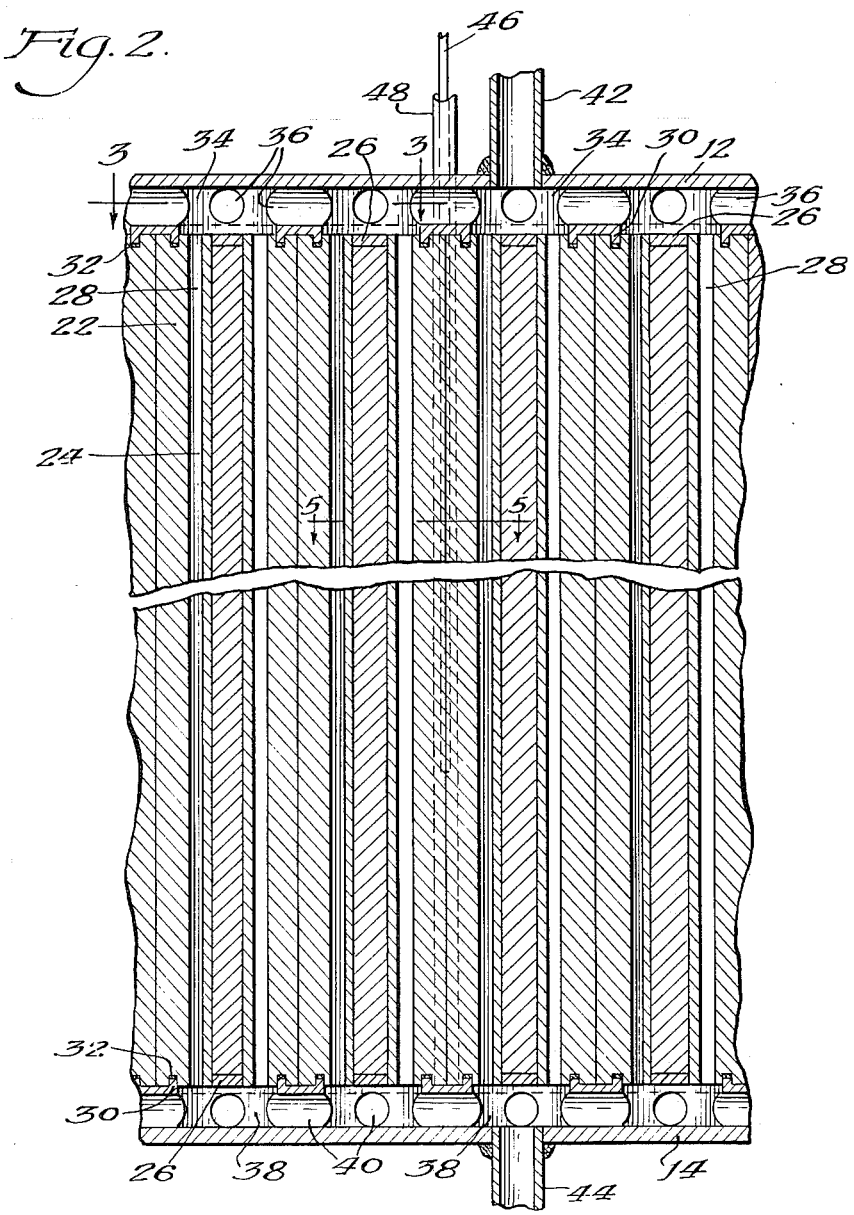

March 14, 1961        S. K. ALLISON        2,975,114

REACTOR

Filed May 8, 1946                              3 Sheets-Sheet 3

Inventor:
Samuel K. Allison
By: Robert A. Laruesse
Attorney.

United States Patent Office 2,975,114
Patented Mar. 14, 1961

2,975,114

REACTOR

Samuel K. Allison, Chicago, Ill., assignor to the United States of America as represented by the United States Atomic Energy Commission Filed May 8, 1946, Ser. No. 668,145

3 Claims. (Cl. 204—193.2)

This invention relates to nuclear fission and more particularly to a novel neutronic reactor comprising means for sustaining a nuclear fission chain reaction, and means for conducting the heat of said reaction from the reactor.

In neutronic reactors, a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing fissionable material such, for example, as natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in Fermi et al. Patent 2,708,656, dated May 17, 1955.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways: by absorption or capture in the uranium content of the bodies without producing fission; by absorption or capture in the moderator material itself; by absorption or capture by the impurities present in both the uranium bodies and the moderator; and by leakage out of the system through the periphery thereof.

In reactors such as above described, replacement of portions of the reactive composition is advantageous to accommodate removal of various poisoning isotopes of high neutron capture cross section formed as the result of nuclear reactions within the system and to accommodate renewal of the fissionable material consumed by the chain reaction. In reactors of the prior art, almost complete reconstruction of the systems has been necessary to accomplish replacement of portions of the reactive material, and it is an object of the present invention to design a reactor which may be partially disassembled and reconstructed without revision of the entire structure.

Another object of the invention is to provide a novel neutronic reactor composed of prefabricated units each comprising a block of solid neutron moderator, such as beryllium, and a member containing fissionable material sealed within said block.

Another object of the invention is to provide coolant passages through the moderator blocks adjacent the fissionable material sealed therein, said passages being adapted to convey a fluid coolant, such as helium or water.

The invention comprehends a novel prefabricated unit comprising a block of neutron moderator containing an elongated mass of material, such as uranium or a compound thereof, having a natural or enriched isotopic content of fissionable substance. The block is provided with one or more longitudinal coolant passages extending from end to end thereof adjacent the mass of fissionable material; and the block comprises engaging means at opposite ends thereof adapted for fluid-tight engagement with associated members having coolant passage means formed and arranged for communication with the coolant passages through the block.

The foregoing and other objects and advantages of the invention will become apparent from a consideration of the following specification and the drawings, wherein:

Fig. 2 is an enlarged vertical section of the reactive composition shown in Fig. 1;

Figure 1:
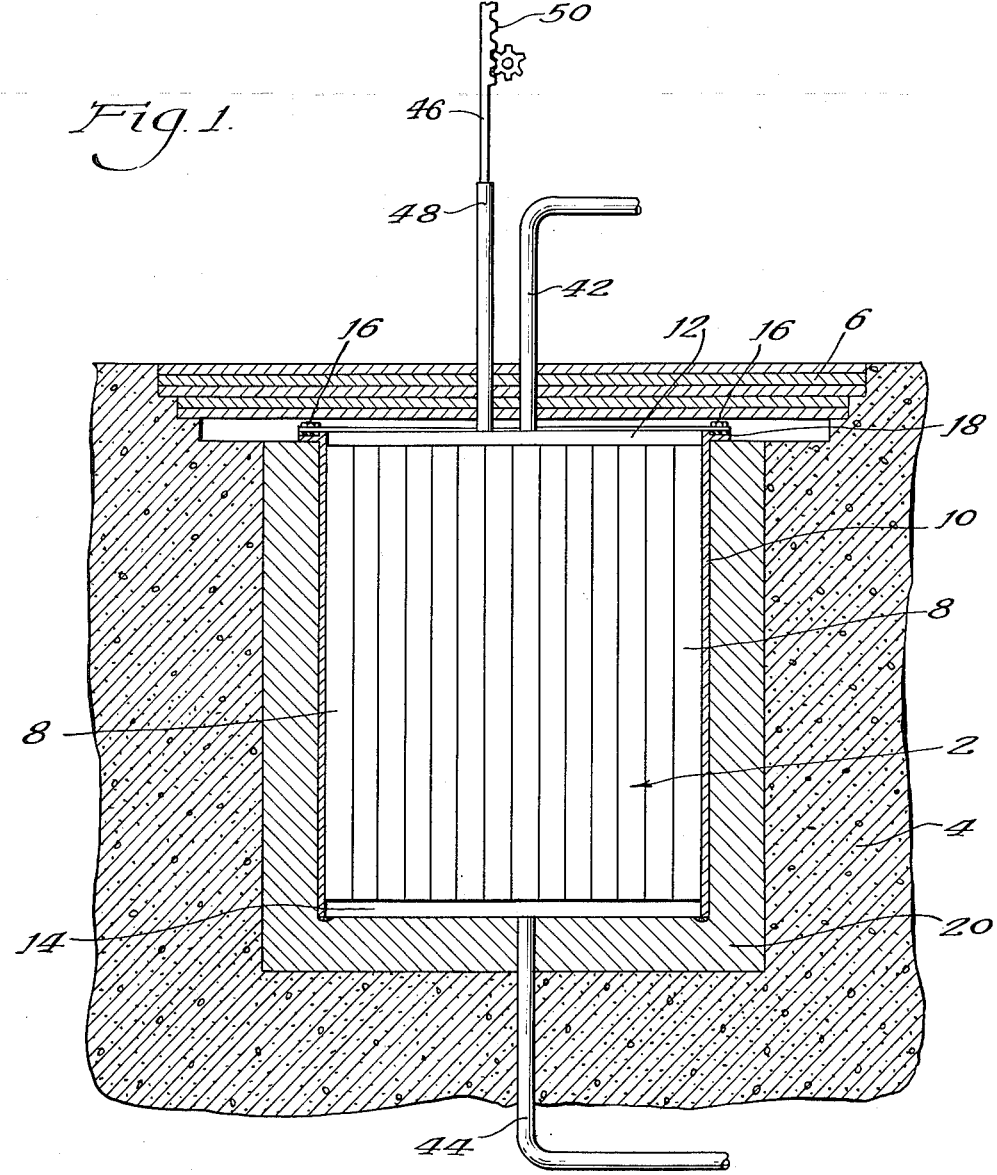
Fig. 1 is a somewhat diagrammatic side elevation of a neutronic reactor embodying the invention, portions of the structure being shown in central vertical section.

Describing the invention in detail and referring first to the embodiment thereof illustrated in Figs. 1 to 5, inclusive, the neutronic reactor generally designated 2 is disposed within a concrete vault 4, as illustrated in Fig. 1, the top of the vault being closed by a composite cover 6, preferably formed of alternate layers of iron and "Masonite." It will be understood by those skilled in the art that the vault 4 and cover 6 function as a biological shield adapted to absorb biologically harmful emanations from the reactor such as, for example, neutrons and alpha, beta, and gamma rays.

The reactor 2 comprises a plurality of prefabricated units 8 in the form of columns disposed within a tank or container 10 of any suitable material, such as stainless steel or aluminum having a relatively small neutron capture cross section. The units 8 are hereinafter described in detail and bear at the top and bottom thereof against header plates or walls 12 and 14 respectively, the top plate 12 being removably secured to a flange on the tank 10 as by stud bolts 16. Suitable packing is provided at 18 to maintain a fluid-tight seal between the plate 12 and the tank 10.

The tank 10 is disposed within a reflector 20 formed of any suitable neutron moderating or scattering material, such as graphite or beryllium, which is effective to reduce neutron losses from the periphery of the reactor, as more fully discussed in the above-mentioned copending application.

Figure 3:
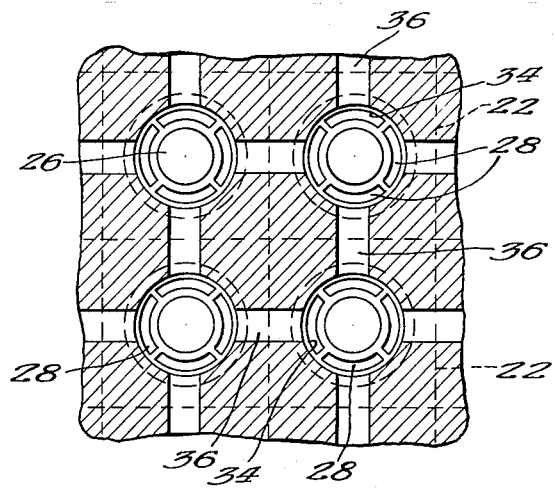
Fig. 3 is a sectional view taken in the horizontal plane indicated by the line 3—3 of Fig. 2.
Figure 4:
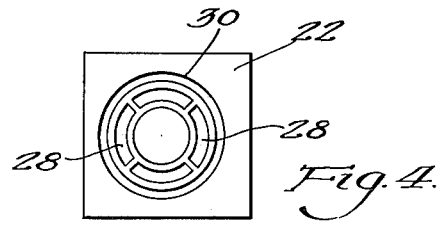
Fig. 4 is a plan view of one of the novel prefabricated units utilized in the composition shown in Figs. 1 to 3.

Referring now to Figs. 2 and 3, it will be seen that each unit or column 8 comprises a block 22 of neutron moderator, such as beryllium, with a central longitudinal passage containing a uranium rod or column 24 having a natural or enriched isotopic content of fissionable material. The rod 24 is sealed within the block 22 by top and bottom caps or closure discs 26 secured to the block 22 in any convenient manner, as by press fitting or by welding. The block 22 is provided with a plurality of longitudinal passages 28, and the top and bottom of the block are provided with annular grooves 30 adapted for the reception of complementary annular tongues on the plates 12 and 14, suitable gaskets being provided at 32 to afford a fluid-tight seal between the block 22 and the top and bottom plates 12 and 14. The passages 28 are arcuate when considered transverse of their lengths so as collectively to surround the associated rod 24 like an interrupted imaginary ring, the ring being interrupted between the passages.

As will be clearly seen in Figs. 2 and 3, the plate 12 is provided with a cylindrical chamber 34 communicating with the fluid passages 28 through each block 22, and the chambers 34 are interconnected by ports 36, 36. The bottom plate 14 is likewise provided with a cylindrical chamber 38 communicating with the passages 28 through each block, and the chambers 38 are interconnected by ports 40. Thus, it will be understood that the top and bottom plates function respectively as inlet and outlet headers communicating with the passages 28 to accommodate flow of a suitable coolant, such as helium or water therethrough, the coolant being admitted to one or more of the chambers 34 through one or more inlet pipes 42 connected to a suitable source (not shown) of coolant under any desired pressure, and the coolant is discharged from the bottom plate 14 by one or more discharge or outlet pipes 44 connected to the chambers 38 therein.

Figure 5:
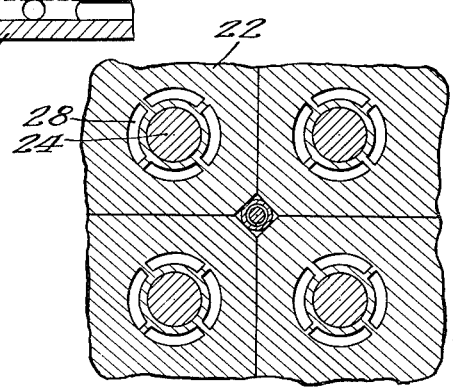
Fig. 5 is an enlarged fragmentary sectional view taken in the horizontal plane indicated by the line 5—5 of Fig. 2.

The neutron density within the reactor is monitored by any conventional means (not shown) and is regulated by one or more control rods 46 of any suitable neutron absorbent material, such as cadmium, said rod being reciprocal within an aluminum tube 48 extending vertically through the reactor in a space defined by beveled corners of the associated moderator blocks 22, as best seen in Fig. 5. The rod 46 is movable inwardly and outwardly of the reactor by any suitable actuating means, such as a rack and pinion mechanism indicated at 50 in Fig. 1.

Figure 6:
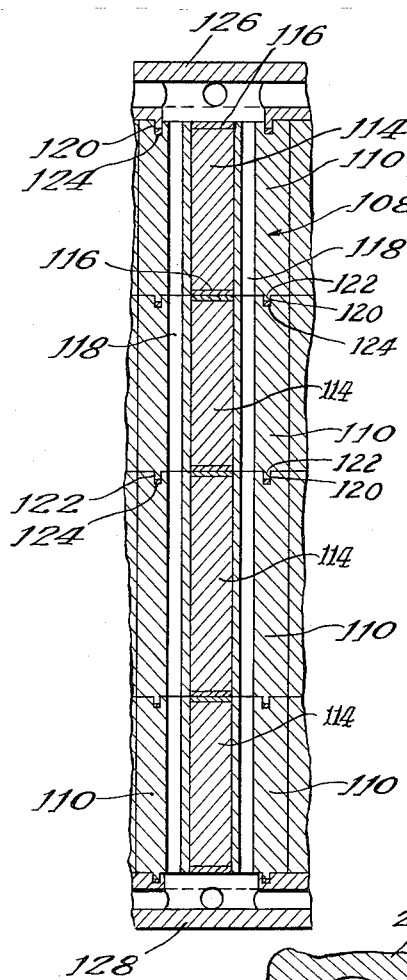
Fig. 6 is a fragmentary vertical sectional view corresponding to that of Fig. 2 and illustrating a modification of the invention.

Referring now to Fig. 6, a modification of the invention is illustrated wherein each reactive column 108 within the neutronic reactor is in the form of a plurality of vertically aligned units, each comprising a block 110 of neutron moderator, such as beryllium comprising a central passage containing a uranium rod or column 114 fitted therein and sealed by top and bottom closure discs 116 secured in any convenient manner to the block 110. The block 110, as in the previously described embodiment, is provided with a plurality of flow passages 118 disposed around the uranium column 114 and spaced therefrom. The block 110 at one end thereof is provided with an annular groove 120, and at the opposite end thereof is provided with an annular tongue 122 adapted for fluid-tight engagement with adjacent blocks, or with top and bottom header plates 126 and 128, suitable packing 124 being provided to insure a fluid-tight seal between adjacent blocks and between the top and bottom blocks and the associated top and bottom header plates 126 and 128, which are similar in construction to the plates 12 and 14 of the previously described embodiment. It will be understood that the modification of Fig. 6 is substantially identical with the embodiment illustrated in Figs. 1 to 4, except that each column 108 is formed of a plurality of prefabricated units 110 rather than a single unit, such as described in connection with Figs. 1 to 4.

While the theories of nuclear fission above described are based on the best presently known experimental evidence, the invention is not limited thereto inasmuch as experimental data later discovered may modify the theories disclosed.

It will be understood that the above-described construction is particularly advantageous in that it accommodates removal and replacement of defective sections by the use of remote control equipment (not shown) and further accommodates enlargement or reconstruction of the neutronic reactor without disassembling the entire structure. Inasmuch as the prefabricated blocks can be constructed of standard size and shape, they may be removed from one reactor and inserted in another or may be replaced without extensive reconstruction of the system.

It will be understood that the above-described embodiments of the invention are merely illustrative thereof inasmuch as many modifications will be readily apparent to those skilled in the art without departing from the spirit of the invention or the scope of the appended claims.

What is claimed is:

1. In a neutronic reactor, means for sustaining a nuclear fission chain reaction comprising a plurality of separable neutron moderator blocks, each formed of a solid material having a relatively small neutron-capture cross section and having a longitudinal hole and longitudinal coolant passages formed directly therein and arranged in a ring about the hole in closely spaced relation thereto, and a mass of thermal-neutron-fissionable material sealed in each moderator block in direct engagement with the hole.

2. The means specified in claim 1, each moderator block being formed of beryllium.

3. The means specified in claim 1, the passages being arcuate when considered transverse of their lengths so as collectively to surround the said mass like an imaginary interrupted ring.

References Cited in the file of this patent

UNITED STATES PATENTS

| 1,282,090 | Lemme | Oct. 22, 1918 |
| 1,920,769 | Stevenson | Aug. 1, 1933 |
| 1,935,659 | Noack | Nov. 21, 1933 |
| 2,371,201 | Wells | Mar. 13, 1945 |
| 2,399,422 | Back | Apr. 30, 1946 |
| 2,708,656 | Fermi et al. | May 17, 1955 |

FOREIGN PATENTS

| 114,150 | Australia | May 2, 1940 |
| 233,011 | Switzerland | Oct. 2, 1944 |

OTHER REFERENCES

Smyth: "Atomic Energy for Military Purposes," pages 103, 177, August 1945; copy may be purchased from Supt. of Documents, Washington 25, D.C.

Kelly et al.: Physical Review, 73, 1135–9 (1948). (Copy in Patent Office Library.)